(No Model.) 2 Sheets—Sheet 1.
W. WANLISS.
SPEEDING GEAR FOR BICYCLES.
No. 583,614. Patented June 1, 1897.
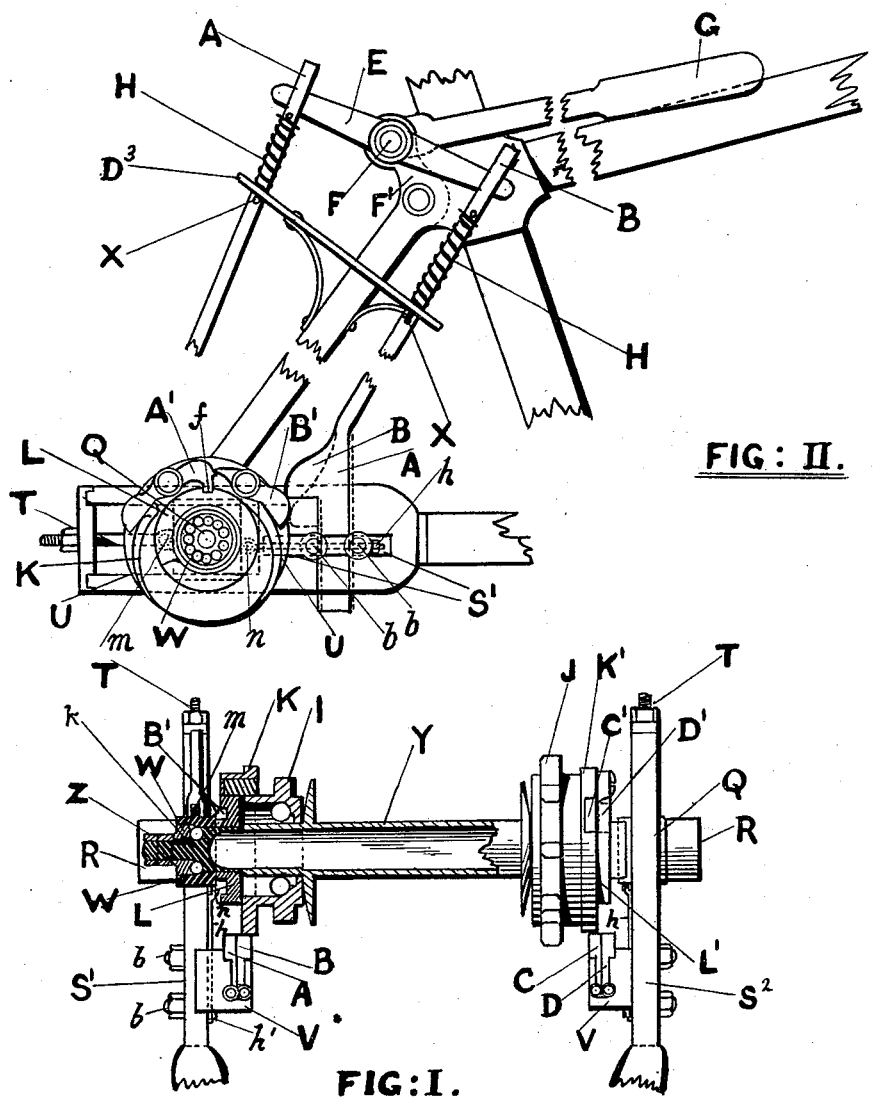

(No Model.) 2 Sheets—Sheet 2.
W. WANLISS.
SPEEDING GEAR FOR BICYCLES.
No. 583,614. Patented June 1, 1897.
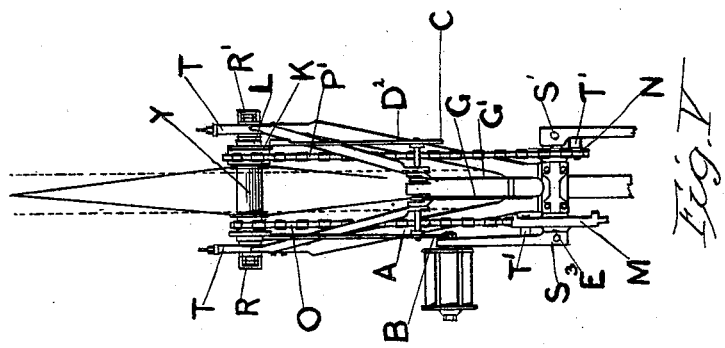
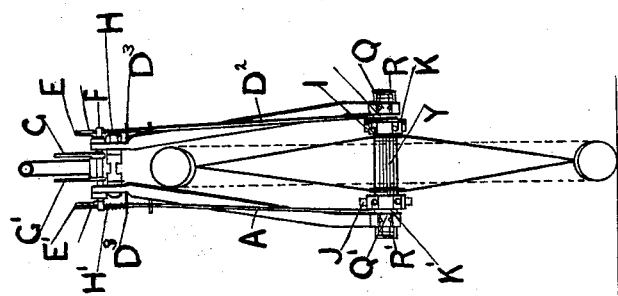
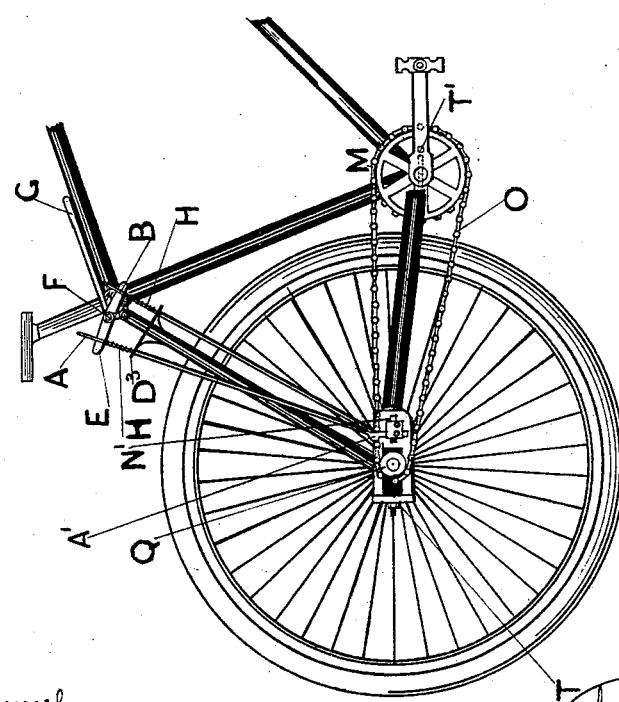
Witnesses
H. van Dloemael
E. A. Scott
Inventor
William Wanliss
by Richardson
Attorneys

UNITED STATES PATENT OFFICE.

WILLIAM WANLISS, OF JOHANNESBURG, SOUTH AFRICAN REPUBLIC.

SPEEDING-GEAR FOR BICYCLES.

SPECIFICATION forming part of Letters Patent No. 583,614, dated June 1, 1897.

Application filed July 10, 1896. Serial No. 598,689. (No model.)

*To all whom it may concern:*

Be it known that I, WILLIAM WANLISS, a British subject, residing at Johannesburg, South African Republic, have invented certain new and useful Improvements in Speeding-Gear for Bicycles, of which the following is a specification.

My invention relates to improvements in the driving of bicycles, whereby a change of speed-gear may be effected without necessity for the rider to dismount or to stop his machine.

Figure I is a view of the hub and spindle, partly in section and partly in front elevation, with the attached parts. Fig. II is a side view of the invention. Fig. III is a side view of part of a cycle with my invention attached. Fig. IV is a rear view of Fig. III with the wheel in section. Fig. V is a plan view of Fig. III.

In carrying out my invention the hub of the hind wheel is forged on a hollow spindle Y, or to which latter it may be pinned or keyed, and I use two sprocket-pinions I and J, respectively, with six or eight teeth (or more or less, as may be desired) on the same spindle, on which they revolve on plain or ball bearings. A flange K K' is cast or forged on the outer side of the sprocket-pinions and to which the catches A' and C' and the tumblers B' and D' are attached by stud-pins, which pass through them and are screwed into the flanges K K. The springs U U for keeping the catches in place are also attached to the latter. The tail ends of the catches A' and C' and the tumblers B' and D', which come in contact with the projections on the releasers A B C D, are turned, respectively, to the right and left, and are so placed that each catch and tumbler will be acted on by its respective releaser only. Two disks L L' are screwed onto the spindle, respectively, with a right and left hand screw on the outer side of the flanges, their use being to keep the sprocket-wheels in their places close up to the hub of the hind wheel, between which and the disks L L', I place thin washers to lessen the friction between them. The principal use of the disks is, however, to drive the machine by engaging with the catch by means of the notch $f$ or notches in their peripheries. The ends of the spindle Y are turned to fit into ball-bearing sliding blocks Q Q', one on each side of the frame, in which they are made to slide and which is suitably constructed to receive them. A sleeve W is fitted over both ends of the spindles and is kept from turning by feather $k$, fitting into a groove in the spindle. A set-nut Z, kept in position by an outer jam-nut, forces the end of the sleeve which is suitably formed underneath the balls in the bearings to take up any wear of the latter. An outer metal cap R or R' is screwed over the nuts to prevent any dust or dirt entering the bearings. The rear of each block Q Q' has a lug $m$ forged or cast in the center to receive a stud-bolt, the other end of which passes through a cross-head T, fitted on the end of the frame and which is set up or tightened by a nut on its outer end, its purpose being to take up the slack of the sprocket-chains O and P. At the opposite ends of the sliding bearing-blocks Q Q' and on their inside edges I form another lug $n$, which is attached to an eyebolt $h$, passing through a sliding block V, in which the releasers work, the use of the bolt being to keep the releasers and the bearing-blocks Q Q' in their relative positions when the chains are being tightened by screwing up the tightening-bolts T, and also to take up any wear and tear of the releasers by means of a second nut $h'$ on the forward end of the releaser-blocks V, which slide in guiding-slots S' and S², formed in the frame on the forward side of the wheel, where they are kept in place by stud-bolts $b$ $b$, which pass through the frame and have nuts on their outer ends to draw the sliding blocks V close to the sides of the slots S' and S² and to fix them in position after tightening up the chains.

In the releaser-blocks I form an oblong slot, in which the two releasers work side by side with an upward and downward motion. These releasers are made with suitably-formed projections and rise and fall about five-eighths of an inch so as to allow the catches and tumblers to pass underneath them after the levers, having been manipulated for the purpose of changing speed, have risen again to their normal position by means of the springs on the upper ends of the rods, the releasers are projected upward in the form of rods, which pass through guides D³, attached to the rear angle-stay, and their upper extremities are formed with a long slot, through each of which passes the end of one of a pair of cross-arms E E', fixed to one spindle F, to which latter also is fixed one of a pair of lever-handles G, each of which works the cross-arm E. The other cross-arm E' is fixed to a sleeve fitted on the spindle to which its before-described fellow cross-arm E is fixed. This sleeve revolves freely on the spindle F, and is actuated by the other lever-handle G'. Thus each lever, and consequently each cross-arm and pair of releasers, work independently of the other, the handles lying side by side, so as to be readily manipulated by one hand.

My object in using two sets of levers is to prevent the catch on the one side of the machine falling into the notch before the opposite catch is set free by its tumbler, a condition which would result in the locking of both disks. Two or more rods may be used, as required. With four rods the change of gear can be effected while the machine is in motion at full speed, but with two rods it would be necessary to slow down before effecting the change of gear. Spiral springs H H are fitted to the upper ends of the releaser-rods, which raise and retain the releasers about five-eighths of an inch from the releaser-block, pins being inserted through the rods to form stops against the guides $D^3$ to prevent the rods rising higher. Washers and pins on the top ends of the springs H H serve to keep them in place and on which their pressure is exerted for raising the rod to the required height.

The end of the rear angle-stay is formed with an arm F', projecting above the bolt, for tightening the saddle-bar, and through which passes the hollow steel spindle F, on which the levers G G' and the cross-arms E E' are fixed.

Two sprocket-wheels M N, with any requisite number of teeth, according to the gearing required, are fitted in the following manner to the crank-spindle S: The spindle is made somewhat longer than in the ordinary single-geared machine, so as to allow room for a sprocket-wheel on either side of the bottom bracket, a shoulder being turned at each end of the spindle, against which the hubs of the driving-sprockets rest. On the outer face of the hub of the sprocket a notch $E^3$ (on plan) is cut, and on the inner face of the crank a tongue $E^3$ is formed which corresponds with and fits into the notch in the hub. The pin which holds the crank in position on the spindle is wedge-formed, so that when driven home it forces the tongue on the inner face of the crank into the notch on the outer face of the hub of the driving-sprocket.

A projection T' is cast on one of the spokes of the sprocket corresponding with a similar projection T'' on the inner face of the crank-arm. A small bolt passing through the two connects the crank-arm firmly to the sprocket, the strain on the hub of the latter when driving being thus greatly reduced. All sprockets are made interchangeable from one side to the other.

*Method of working.*—When traveling on a level road, the high-speed gear will naturally be used. The point of the high-speed catch A' is then in the notch $f$ of the disk L beside the smallest sprocket-pinion I and is held there by the spring U on the flange K, the machine being thus set on the high-speed gear. Should a rising grade be encountered by the traveler, he will then require the speeding of the machine to be changed from high to low speed in order to lessen the labor and exertion necessary to drive the machine up a rising gradient. This is done without necessity for the rider to dismount and while still traveling by pressing down the lever G, which depresses the catch-releaser B and allows the tail of the catch A' to strike against the releaser and be raised and locked out of gear by the tumbler B'. The machine is now out of gear, and to put it on the slow speed the handle G' is lifted, which, by means of the rear end of the cross-arm E', depresses the catch-releaser D. The tail end of the tumbler D' then comes round and strikes the releaser and allows the catch C' to fall into a notch in the disk L', where it is locked and held in place by the spring $U^3$. To change again from slow to high speed, the actions of the levers are simply reversed.

$x$ represents a split cotter or pin for keeping the releaser-rods down to the required position.

Having now particularly described and ascertained the nature of this invention and in what manner the same is to be performed, I would observe, in conclusion, that what I consider to be novel and original, and therefore claim as my invention, is—

1. In differential speeding-gear for bicycles, the sprocket-pinions I and J revolving loosely on the after spindle Y; the flanges K formed on their hubs; the catches A' and C'; the tumblers B' and D' attached to the flanges by stud-pins; the springs U, U; the catch and tumbler releasers A, B, C, D; the sliding blocks Q, Q, in which the ends of the spindle Y revolve the sliding blocks V, V, in which the catch and tumbler releasers work; the disks L, L, having notches in their peripheries into which the ends of the catches fall and lock; the secondary slots S' and $S^2$ in which the releaser-blocks, which are secured by the stud-bolts $b$, $b$, slide; the cross-arms E, E'; the levers G, G'; the extension of the backstay of the present form of bicycle above the saddle-bolt $a$ in the top of which the spindle F is set as shown at F', substantially as described in the foregoing specification and shown on the accompanying drawings.

2. In combination in a driving-gear for cycles, the crank-shaft, the pair of sprockets thereon, the rear wheel with its axle, a pair of notched disks on the axle, a pair of sprocket-wheels, the catches carried thereby to engage the notched disks, tumblers for holding the catches out of engagement with the disks independent of the catches to engage and disengage the same, and releasers for the catches and tumblers respectively, said releasers being independent of each other, substantially as described.

3. In combination in a change-gear driving mechanism for cycles, the two sets of pawl-and-ratchet mechanisms, the rear axle, releasers for the ratchet mechanisms, the sliding box carrying the ratchet-drivers and the rear axle with adjusting means, the sliding boxes carrying the releasers and connections between the sliding boxes whereby they are adjusted together substantially as described.

4. In combination in a driving-gear for cycles, the crank-shaft, the pair of sprockets thereon, the rear wheel with its axle, a pair of notched disks thereon, a pair of sprocket-wheels the catches carried thereby to engage the notched disks, tumblers for holding the catches out of engagement with the disks, and releasers for the catches and tumblers respectively said catches and tumblers being pivoted and having tail portions to be acted upon by the releasers, substantially as described.

In witness whereof I have hereunto set my hand in presence of two witnesses.

WILLIAM WANLISS.

Witnesses:
D. LEWIS WOOLF,
R. QUANCE.